May 26, 1931.　　　　　K. E. PEILER　　　　　1,807,071
ELECTRICALLY HEATED CONTAINER FOR MOLTEN GLASS
Filed March 30, 1922
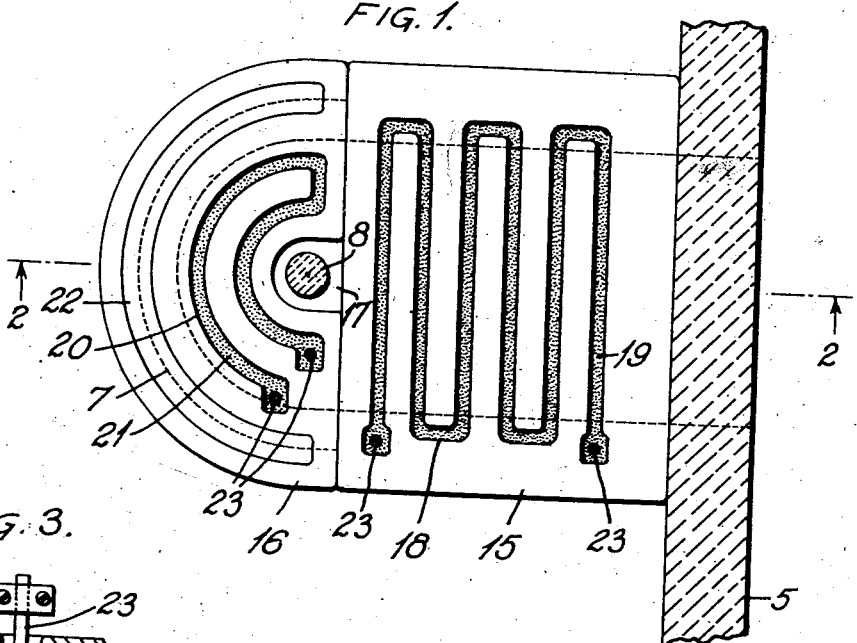
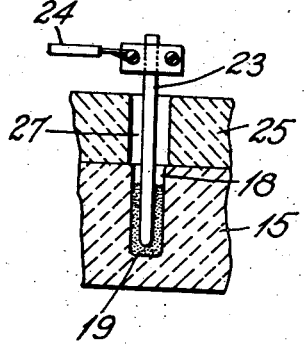
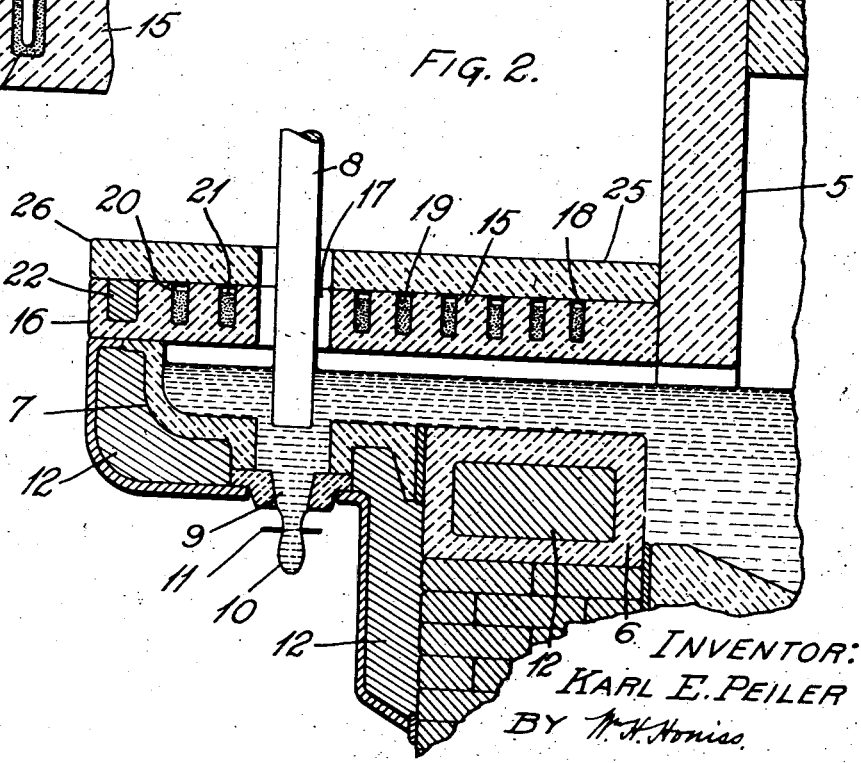
INVENTOR:
KARL E. PEILER
BY　　　　　　
　　　　ATT'Y.

Patented May 26, 1931

1,807,071

UNITED STATES PATENT OFFICE

KARL E. PEILER, OF WEST HARTFORD, CONNECTICUT, ASSIGNOR, BY MESNE ASSIGNMENTS, TO HARTFORD-EMPIRE COMPANY, OF HARTFORD, CONNECTICUT, A CORPORATION OF DELAWARE

ELECTRICALLY HEATED CONTAINER FOR MOLTEN GLASS

Application filed March 30, 1922. Serial No. 547,991.

This invention relates to containers for molten glass, and more particularly to the forehearth usually connected with glass melting furnaces or tanks, and from which the molten glass is taken to form mold charges for use in glass shaping machines.

The object of the invention is to provide a container for molten glass, such as the forehearth of a furnace, having new and improved means for conditioning the glass, and especially for maintaining its desired thermic condition up to and during the time that mold charges are being segregated from the glass.

The features of the invention will be best understood from the following description, taken in connection with the accompanying drawings, in which Figure 1 is a plan view of a forehearth and a part of the associated tank, the top plate being removed, Fig. 2 is an elevation on the line 2—2 of Fig. 1, and Fig. 3 is a detail elevation in vertical section, showing one of the terminals for supplying electric current to the heating unit.

The embodiment of the invention selected for the purpose of illustration, comprises a glass melting furnace or tank 5, having connected therewith a channel block 6 and a spout block 7 which together provide a forehearth of a well-known type. Any of the usual devices for delivering the glass in mold charges may be employed. In this illustration a plunger 8 cooperates with an outlet 9 in the spout block, to feed out the glass in a succession of suspended gobs or gathers 10 from which mold charges are severed by a shear mechanism indicated at 11. The bottom and sides of the forehearth may be provided with insulating material 12 to minimize the heat losses.

It is highly desirable that the glass thus passing through a forehearth shall be at the proper working temperature, and this has commonly been secured by the use of burners playing on or near the glass in the forehearth, and it has also been proposed to heat the glass in the forehearth by electric resistance. In such apparatus as has been designed for electrical heating, certain difficulties have been found; metallic resistance would not produce the necessary high temperature, and the structures provided for the use of granular resistance necessitate a stoppage of the feeding operation, in order to replace the resistance which replacement is frequently necessary on account of the oxidization of the resistance material.

The present invention overcomes these difficulties by providing a heating element in one of the enclosing walls of the forehearth, having channels for the receipt of a resistance element, preferably granular, which can be readily replaced without interfering with the continuous operation of the apparatus. The heating element is conveniently mounted in a cover for the forehearth and in order to provide for varying the heat at different points in the container, a plurality of resistance circuits are preferably provided which may be carried by separate parts of the cover.

The cover is preferably made in two parts 15 and 16 of such shape as to enclose the entire opening in the top of the forehearth. A suitable opening 17 may be provided for the passage of the plunger 8 or for the introduction of any other gather forming implement. The cover 15 is provided with a channel or channels 18 which receive the resistance element 19 and while any desired form of electrical resistance may be employed, it is preferred to use some granular material, such as a mixture of carbon and graphite, which adapts itself to the shape of the channel and by which the channel can be filled to present the necessary area in cross section. A further advantage of the granular resistance is that the loss by oxidization of the element can be compensated by adding small quantities of the material as may be needed.

The cover 16 is provided similarly with a channel 20 containing a resistance element 21. This channel may be shaped to partially surround the opening 17 for the plunger 8, so as to distribute the heat where desired. The marginal portion of the outside edge of the cover 16 is channeled to receive heat insulating material 22 which reduces the heat loss through the edge of the cover.

Electric current may be connected with the resistance elements 19 and 21 in a convenient manner by the use of carbon terminal rods 23 projecting into the loose granular resistance material at the ends of the channels. The upper end of each rod is suitably connected with a wire 24 (Fig. 3) leading to a source of electrical energy. The current supplied to the two resistance elements may be separately regulated so as to determine to a fine degree the temperature of the glass locally.

It will be understood that most refractory materials and more particularly such refractory materials as are commonly used for containing molten glass have some degree of electrical conductivity when hot. There are, however, refractory materials available which are insulators for all practical purposes under the conditions to which this apparatus is subjected. If, however, the ordinary refractories commonly employed are used, their degree of conductivity is so much less than the conductivity of desirable granular resistance material that the leakage through the refractory which would tend to short circuit the resistor would not be harmful. Moreover, such leakage through the refractories would generate heat and would, therefore, assist in accomplishing the desired result. As is also understood, the channels and terminals may be separated far enough that short circuiting of the granular resistor may be made negligible under most circumstances.

Both covers are provided with refractory top plates 25 and 26 which reduce the heat loss and the oxidization of the resistance material. Openings 27 (Fig. 3) are provided in the covers for the reception of the terminal rods 23.

The construction described provides an efficient heating device, the effectiveness of which is due in part to the close proximity of the heating means to the surface of the glass, and to the independently regulable means for keeping the glass in the most desirable thermic condition. When it is necessary to replace or to add to the resistance element, this may be done by removing the plates 25 and 26, sweeping out the old material if desired, and replacing or replenishing with new material, all without interruption of the continuous operation of the plunger 8 or whatever form of discharge regulating implement may be employed. The heat insulating material 12 used in conjunction with the heating cover, produces a condition of uniform consistency through the glass in the forehearth, which is an important feature.

The particular embodiment of the invention described is selected for the purpose of illustration only, and it is to be understood that the invention can be modified and changed in various details without departing from the scope of the invention as defined in the appended claims.

I claim:—

1. Apparatus for feeding molten glass, comprising a container having a discharge outlet, a cover plate for the container, heating means located in said container out of contact with the glass and adjacent to the cover plate, said heating means including refractory members provided with laterally extending channels in their upper surfaces, independently controlled electrical heating elements located in the channels for heating the glass at the discharge outlet, said cover plate being removable to permit access to the heating elements.

2. Apparatus for feeding molten glass, comprising a container having a discharge outlet, a flat cover plate for the container provided with an opening in vertical alignment with the outlet, a glass feeding implement projecting through the cover plate and in alignment with said outlet, heating means located in the container above the surface of the glass, including sectional refractory members provided with channels in their upper surfaces, said channels arranged in a sinuous path throughout the refractory members, independently controlled electrical heating elements located in the channels for heating the glass flowing to the discharge outlet, said cover plate being removable to permit access to the heating elements.

3. A container for molten glass in combination with a cover therefor having a channel near the center of the upper surface and a channel near the edge, granular electrical resistance material in the central channel, heat insulating material in the edge channel, means for connecting an electric current to heat the resistance, and a plate to cover both channels.

4. Apparatus for feeding molten glass, comprising a glass container having a discharge outlet, a sectional cover for the container, and heating means located close to the surface of the glass, including a plurality of independently controlled removable electrical heating units extending laterally across the container to heat the glass, said cover sections being removable to permit access to said heating units.

5. Apparatus for feeding molten glass, comprising a glass container having a discharge outlet, a sectional cover for the container, and heating means located close to the surface of the glass, including a plurality of independently controlled electrical heating units extending laterally completely across the container, said cover sections being removable to permit access to the heating units.

6. Apparatus for feeding molten glass, comprising a glass container provided with a discharge outlet, a removable sectional cover for the container, heating means located out of contact with and relatively close to the surface of the glass, including a plurality of refractory members provided with channels in their upper surfaces, said channels extending in a sinuous path having portions extending transversely of the container, electrical heating elements in the channels, and means for independently supplying electric current to the electrical elements in each refractory member.

7. Apparatus for feeding molten glass, comprising a container for the glass having a discharge outlet, a cover wall for the container comprising superposed cover plates divided into sections, the lower plates being heater members and located close to the surface of the glass, said members being provided with a plurality of cavities in their upper surfaces, granular electrical resistance elements placed in the cavities, and means for independently supplying electrical energy to the resistance material in certain of the cavities to regulate the heat supplied directly to the glass, the upper cover plate being removable to permit access to the cavities for repair or replacement of the electrical elements.

8. A glass feeding forehearth provided with a downwardly opening discharge outlet, a removable cover extending across said forehearth, said cover having an opening through which a discharge regulating implement may project into the glass above the outlet, and a plurality of independently controlled electrical heating units positioned in the top portion of the forehearth and out of contact with the glass for heating the glass flowing through the forehearth, said heating units being removable and replaceable when said cover has been removed and said cover being removable without disturbing the discharge regulating implement.

9. A glass feeding forehearth provided with a removable flat cover and electrical heating elements positioned out of contact with the glass for heating the glass in the forehearth so as to be protected by said cover, said cover comprising a plurality of superposed sections and said heating elements being disposed between said superposed sections.

10. Apparatus for feeding molten glass, comprising a glass container provided with a discharge outlet, a sectional cover for the container provided with an opening in vertical alignment with the outlet, a glass-working implement projecting through the opening and into the glass adjacent to the outlet, and heating units located above the surface of the glass, including a plurality of independently controlled electrical heating means extending laterally across the container and at opposite sides of the implement, thereby heating the glass at the outlet, said cover sections being removable to permit repair or replacement of the heating elements without interrupting the operation of the feeder implement.

11. A glass feeding forehearth provided with a downwardly opening discharge outlet, a flat cover closing the top of said forehearth and having an opening above said discharge outlet for the admission of a discharge-controlling implement, heating means arranged co-extensively with the cover and divided into front and rear units, curved channels in the front unit concentric with said implement-receiving opening, other channels in the rear unit of said heating means and independently controlled electrical heating elements disposed in said channels for heating the glass, the flat cover being separable from the portion of said cover containing said channels.

Signed at Hartford, Connecticut, this 27th day of March, 1922.

KARL E. PEILER.